United States Patent
Keller et al.

(10) Patent No.: US 12,187,431 B2
(45) Date of Patent: Jan. 7, 2025

(54) CONTAINER SUSPENSION AND RELEASE SYSTEM

(71) Applicant: The Boeing Company, Chicago, IL (US)

(72) Inventors: Cory Gordon Keller, St. Charles, MO (US); James V. Eveker, Berkeley, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/713,600

(22) Filed: Apr. 5, 2022

(65) Prior Publication Data

US 2022/0363387 A1 Nov. 17, 2022

Related U.S. Application Data

(60) Provisional application No. 63/185,824, filed on May 7, 2021.

(51) Int. Cl.
*B64D 1/06* (2006.01)
*B64D 1/12* (2006.01)

(52) U.S. Cl.
CPC ............... *B64D 1/06* (2013.01); *B64D 1/12* (2013.01)

(58) Field of Classification Search
CPC ... B64D 1/04; B64D 1/06; B64D 1/08; B64D 1/12
See application file for complete search history.

(56) References Cited

U.S. PATENT DOCUMENTS

| | | | | |
|---|---|---|---|---|
| 3,670,620 A | * | 6/1972 | Paraskewik | B64D 1/04 294/82.26 |
| 4,202,576 A | * | 5/1980 | Hasquenoph | B64D 7/08 294/82.26 |
| 2006/0108478 A1 | * | 5/2006 | Bajuyo | B64D 1/04 244/137.4 |
| 2020/0025513 A1 | * | 1/2020 | Wright | F41F 3/06 |
| 2020/0164982 A1 | | 5/2020 | Keller et al. | |
| 2020/0164983 A1 | | 5/2020 | Keller et al. | |
| 2020/0391866 A1 | | 12/2020 | Keller et al. | |

OTHER PUBLICATIONS

Everett, Win, et al. "Preliminary Evaluation of the F/A-18 Quantity/Multiple Envelope Expansion." DTIC, Jan. 1, 1994, apps.dtic.mil/sti/citations/ADA284119. Accessed Jun. 29, 2023. (Year: 1994).*

* cited by examiner

*Primary Examiner* — Joshua J Michener
*Assistant Examiner* — Ka Chun Leung
(74) *Attorney, Agent, or Firm* — Yee & Associates, P.C.

(57) ABSTRACT

A container suspension and release system provides at least one ejector assembly having a carry position and a deployed position. The ejector assembly includes an actuator configured to extend ejector assembly from the carry position to the deployed position, and a retention assembly. The retention assembly employs a bracket attached to the actuator and a fixed sway brace extending from the bracket. A left retention arm is pivotally attached to the bracket and a right retention arm is pivotally attached to the bracket, with the left and right retention arms configured to rotate in opposite directions. A rotation activation mechanism is provided to rotate the left and right retention arms in the deployed position. An energy source connected to the actuator to provides energy to actuate the at least one ejector assembly.

5 Claims, 15 Drawing Sheets

CONTAINER SUSPENSION AND RELEASE SYSTEM

REFERENCES TO RELATED APPLICATIONS

This application claims priority of U.S. provisional application No. 63/185,824 filed on May 7, 2021 entitled CONTAINER SUSPENSION AND RELEASE SYSTEM, having a common assignee with the present application, the disclosure of which is incorporated herein by reference. This application is copending with U.S. application Ser. No. 16/439,338, entitled CONTAINER RETENTION AND RELEASE APPARATUS HAVING INTEGRAL SWAY-BRACE AND RETENTION FEATURES with a filing date of Jun. 12, 2019, issued as U.S. Pat. No. 11,505,318 dated Nov. 22, 2022, and having a common assignee with the present application, the disclosure of which is incorporated herein by reference.

FIELD OF THE DISCLOSURE

This disclosure relates generally to aircraft and, more particularly, to a container suspension and release apparatus having mechanically actuated retention arms and fixed sway brace arms.

BACKGROUND

When suspending disposable containers (e.g., a weapon, a payload, a cargo container, etc.) from aircraft, it is desirable to provide suitable chocks or sway braces to steady the container while carrying the container in flight to the point at which the container is released. Combining sway braces and release mechanisms is also desirable but may in certain instances result in inadvertent release of the container when adverse aerodynamic loading is experienced. Military aircraft that are used to dispense bombs, rockets, and other stores in flight usually include racks located beneath the wings and/or fuselage, or in weapon bays designed to release the stores upon command. Commercial aircraft that are used to dispense containers in flight usually include a retention and/or release system located beneath the fuselage (e.g., a belly of the fuselage).

SUMMARY

A container suspension and release system as disclosed herein provides at least one ejector assembly having a carry position and a deployed position. The at least one ejector assembly includes an actuator configured to extend the at least one ejector assembly from the carry position to the deployed position and a retention assembly. The retention assembly employs a bracket attached to the actuator and a fixed sway brace extending from the bracket. A left retention arm is pivotally attached to the bracket and a right retention arm is pivotally attached to the bracket, with the left and right retention arms configured to rotate in opposite directions. A rotation activation mechanism is provided to rotate the left and right retention arms in the deployed position. An energy source connected to the actuator to provides energy to actuate the at least one ejector assembly.

The disclosed implementations provide a method for captive carry and release of a container on an aircraft. A container is engaged in a carry position with at least one ejector assembly having a retention assembly with at least one fixed sway brace, a left retention arm and a right retention arm. The at least one ejector assembly is extended from the carry position to the deployed position with an actuator. The left and right retention arms are rotated in the deployed position with a rotation activation mechanism.

BRIEF DESCRIPTION OF THE DRAWINGS

The features, functions, and advantages that have been discussed can be achieved independently in various implementations of the present disclosure or may be combined in yet other implementations, further details of which can be seen with reference to the following description and drawings.

Certain examples are shown in the above-identified figures and described in detail below. In describing these examples, like or identical reference numbers are used to identify the same or similar elements. The figures are not necessarily to scale and certain features and certain views of the figures can be shown exaggerated in scale or in schematic for clarity and/or conciseness.

DETAILED DESCRIPTION

Containers (e.g., stores, weapons, missiles, etc.) can be attached to and released from an aircraft. Containers can be used to carry munitions or other material (e.g., bombs, rockets, missiles, rations, etc.) to be dropped from the aircraft upon command. To carry and dispense containers upon command, aircraft often employ container suspension and release systems (e.g., bomb racks) located beneath the wings and/or fuselage.

However, when coupled beneath the wings and/or fuselage, a condition known as captive carry, containers can be exposed to many sources of mechanical vibration or aerodynamic loading that can affect system reliability, safety, and mission effectiveness.

Example implementations of container suspension and release systems disclosed herein retain and release a captively carried container in-flight. To retain and release a container, the container suspension and release system employ an example retention apparatus incorporating a plurality of store retention arms. In the example implementations, the retention apparatus mates to an external surface of a container and interfaces with a plurality of lugs, pins, posts or other protrusions of a container external to an outer mold line (OML) of the store or container to engage the container in a carry position. The example container suspension and release system disclosed herein allows a reduced size of the protrusions compared to typical lugs, hangers and/or attach points. The container suspension and release system disclosed herein improves aerodynamic characteristics (e.g., a smooth outer surface), thereby improving a range of the container and/or reducing detectability of the container by radar. Additionally, the lugs or posts disclosed herein are part of the container body and do not protrude into the container to accommodate rocket motors or other components internal to the container.

The container suspension and release system disclosed herein additionally employs fixed sway brace arms to accommodate side loads during ejection allowing consistent release of the container at a deployed position. A rotation activation mechanism to rotate the store retention arms from an engaged condition in the carry position to a released condition in the deployed position, exemplified by an ejection piston operating on rotation levers or tensioning lanyards coupled to the retention arms in the disclosed implementations, assures positive actuation of the retention arms and release of the container.

Figure 1:
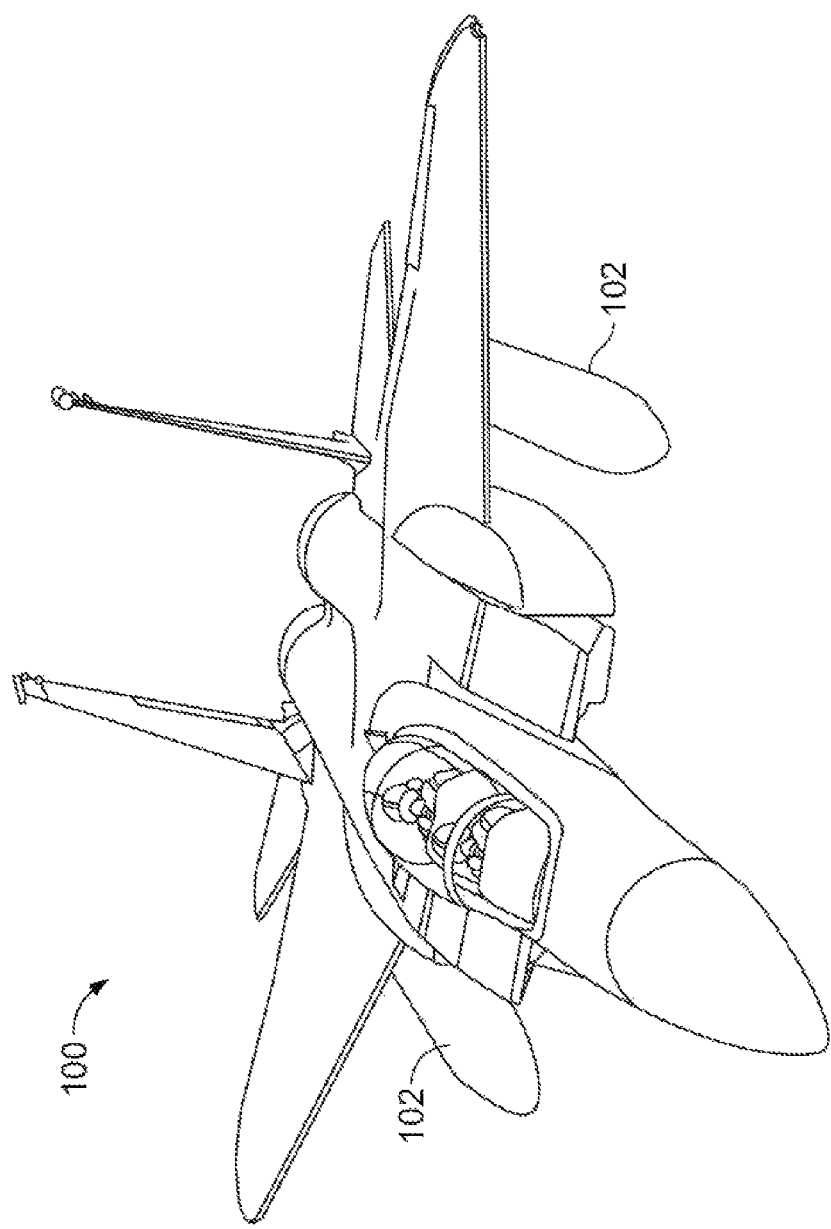
FIG. 1 is a perspective view of an example aircraft that can be implemented with an example container suspension and release system disclosed herein.

FIG. 1 is an aircraft 100 that can be implemented with an example container suspension and release system constructed in accordance with teachings of this disclosure. The example implementations of the container suspension and release system disclosed herein may be employed as a bomb rack that retains and/or releases a store 102 (e.g., a container, a weapon, a missile, etc.) carried by the aircraft 100 of FIG. 1. The example teachings disclosed herein are not limited to aircraft of the type shown as aircraft 100 of FIG. 1. The container suspension and release system disclosed herein can be implemented with other types of aircraft such as, for example, vertical takeoff and landing aircraft, military aircraft, helicopters, drones, commercial aircraft, and/or any other type of aircraft.

Figure 2A:
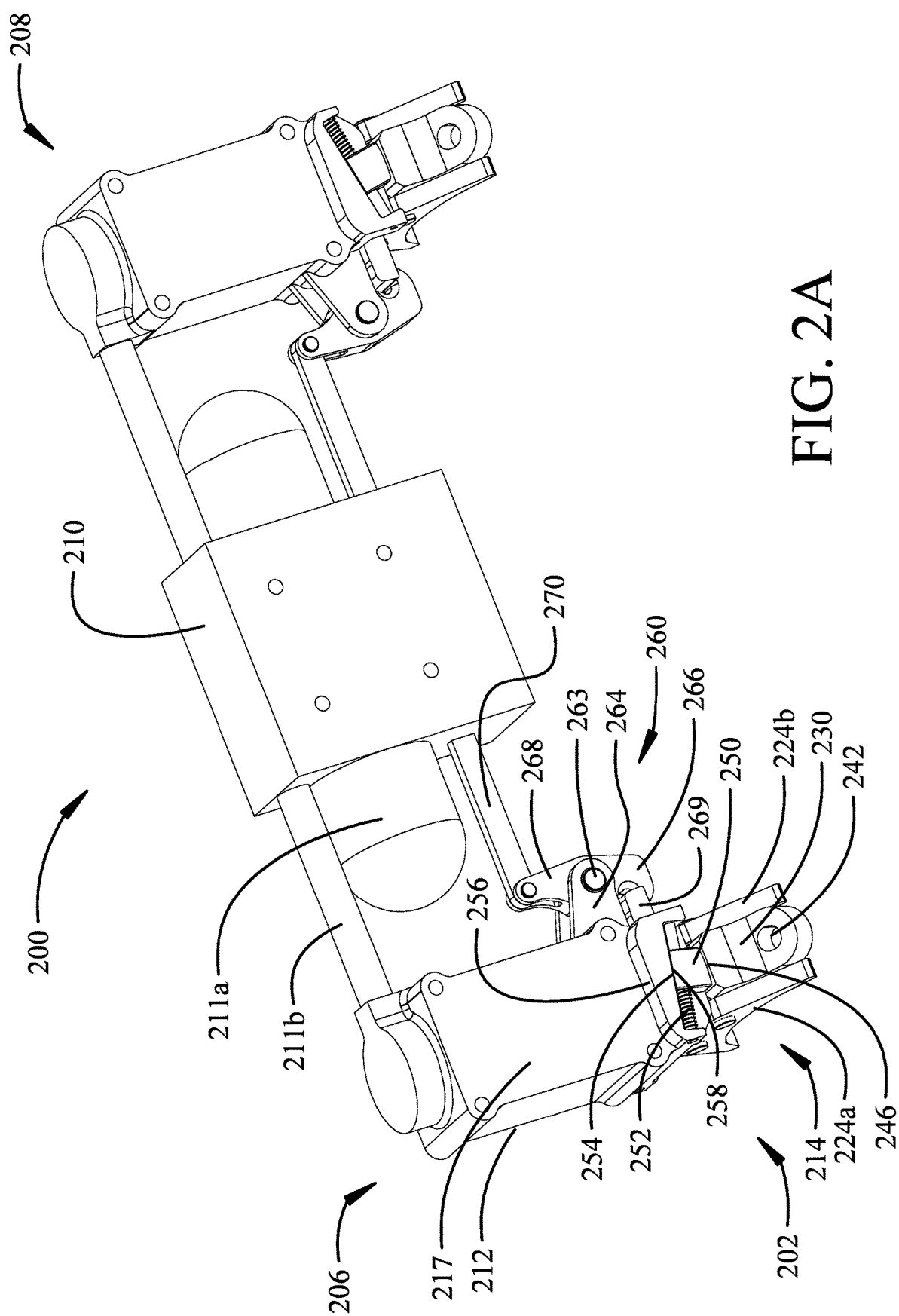
FIG. 2A is a perspective view of an example implementation of container suspension and release system in a retracted or carry position.
Figure 2B:
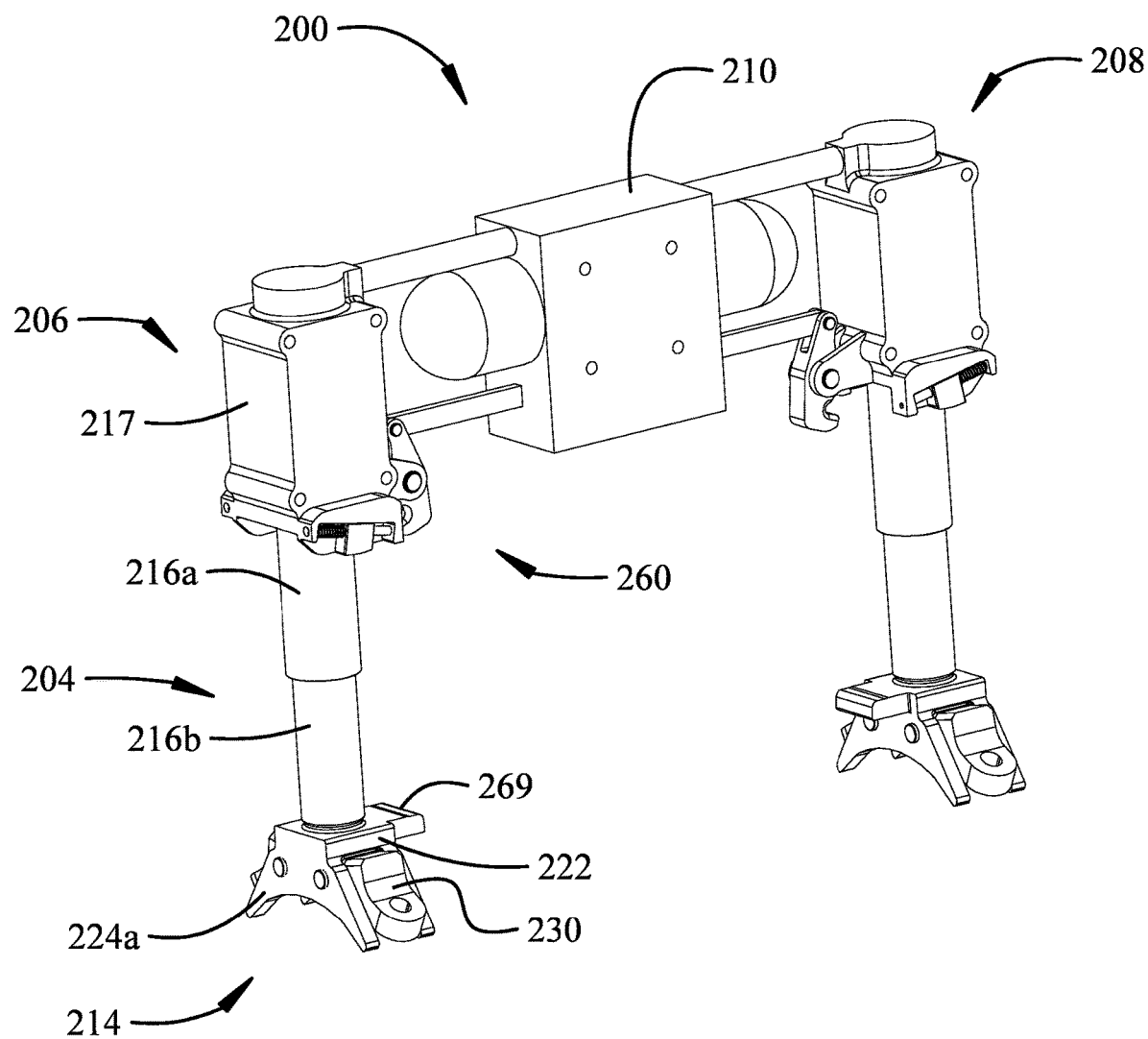
FIG. 2B is a perspective view of the example implementation in an extended or deployed position.

FIGS. 2A and 2B are perspective views of an example implementation of a container suspension and release system 200. FIG. 2A is a perspective view of the example container suspension and release system 200 in a retracted or carry position. FIG. 2B is a perspective view of the container suspension and release system 200 in an extended or deployed position. The aircraft 100 of FIG. 1 can implement the example container suspension and release system 200 disclosed herein.

To move the container suspension and release system 200 between the carry position 202 (e.g., shown in FIG. 2A) and the deployed position 204 (e.g., shown in FIG. 2B), the container suspension and release system 200 includes at least one ejector assembly, which for the example implementation is, a first ejector assembly 206, a second ejector assembly 208, and an energy source 210. The energy source 210 in example implementations can be a pneumatic energy source, a hydraulic energy source, a pyrotechnic energy source and/or any other energy source connected to the actuator to provide energy to actuate the first ejector assembly 206 and the second ejector assembly 208. For the example in the drawings, the energy source is pneumatic or hydraulic and employs a reservoir 211a containing pressurized fluid. Conduits 211b supply the pressurized fluid from the reservoir 211a to the first and second ejector assemblies 206, 208 for operation.

The first ejector assembly 206 and the second ejector assembly 208 are configured to simultaneously deploy upon activation of the energy source 210 to release a container. The second ejector assembly 208 is identical (a mirror image) in both structure and function to the first ejector assembly 206. The first ejector assembly 206 will be described in detail herein and those details are applicable to the second ejector assembly 208.

Figure 3A:
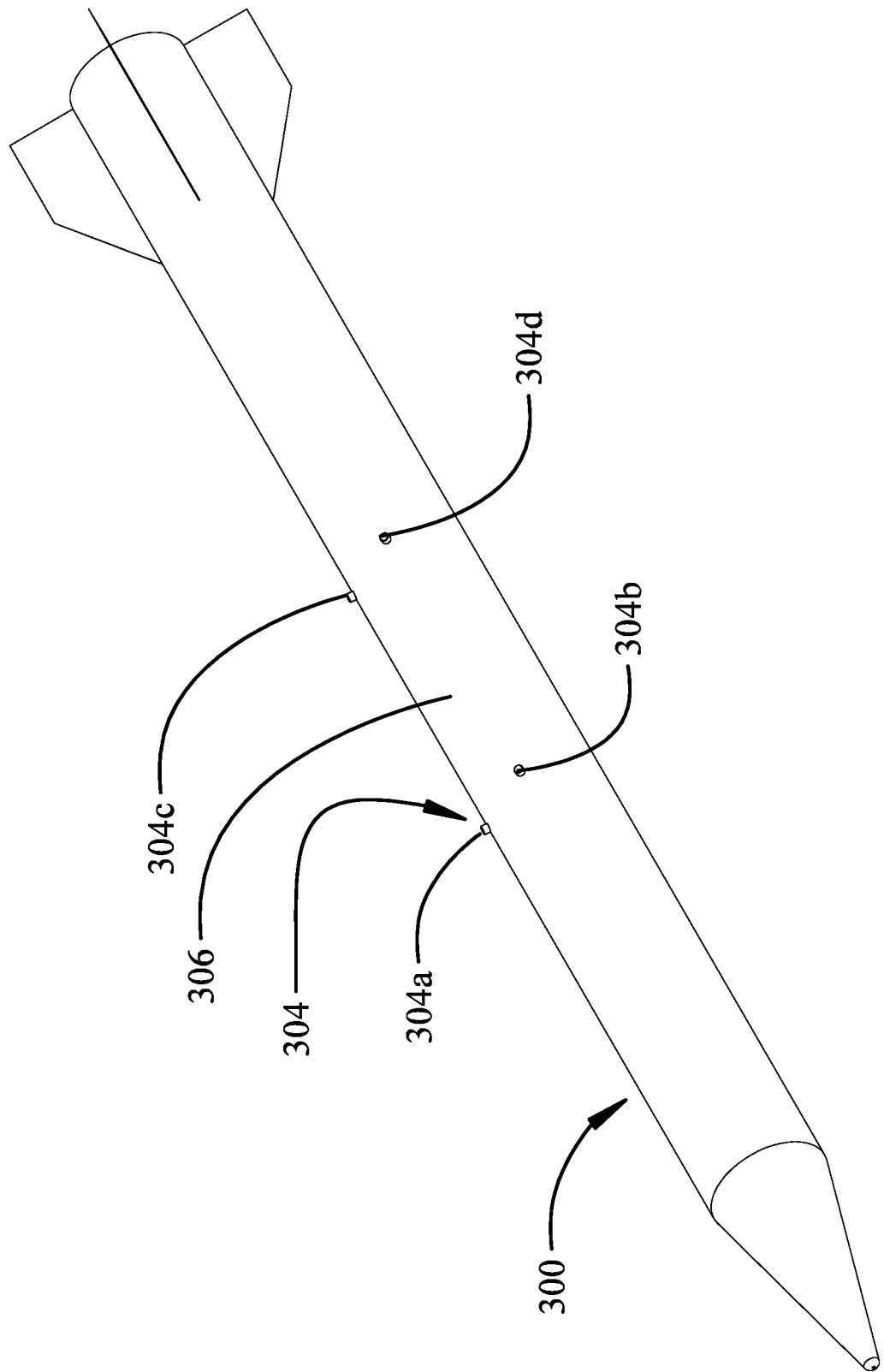
FIG. 3A is a perspective view of an example container that can carried by the example container suspension and release system of FIGS. 2A and 2B.
Figure 3B:
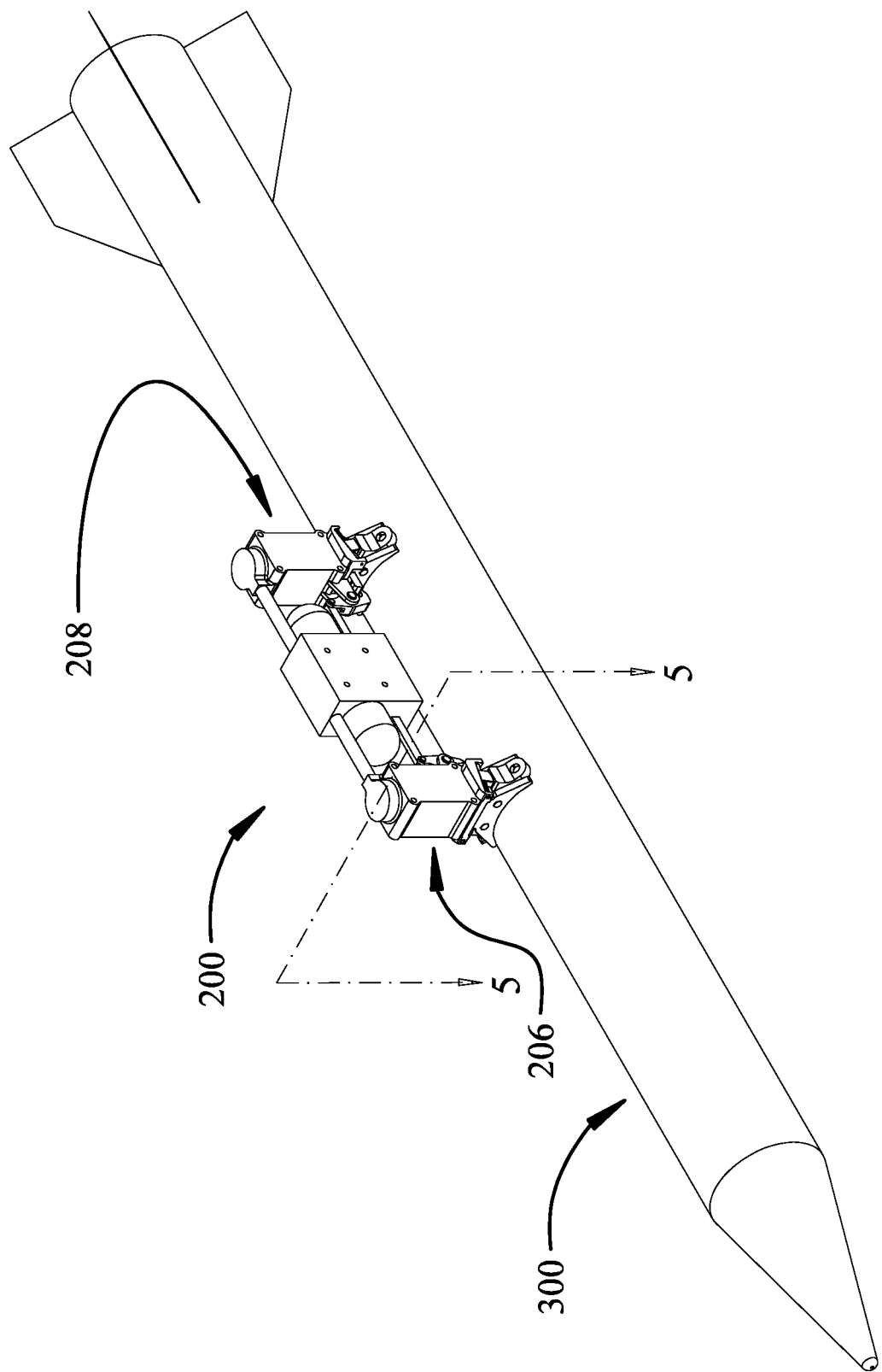
FIG. 3B is a perspective view of the example container suspension and release system of FIG. 2A coupled to the example container of FIG. 3A shown in an example stored position.
Figure 3C:
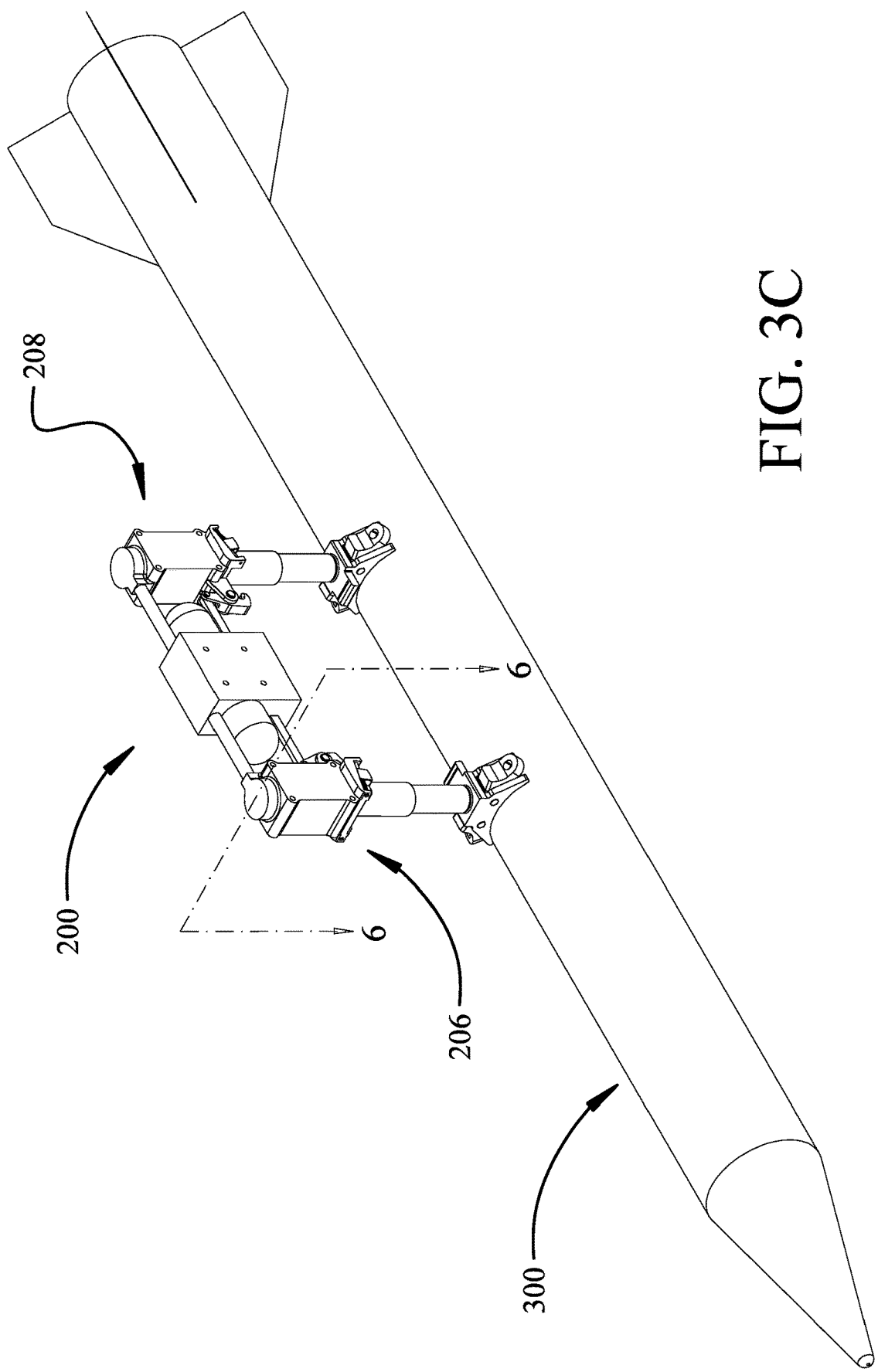
FIG. 3C is a perspective view of the example container suspension and release system of FIG. 2B coupled to the example container of FIG. 3A shown in an example deployed position.

The first ejector assembly 206 and the second ejector assembly 208 mutually retain and release a container 300 as shown in FIG. 3A in one example of the store 102 carried by aircraft 100 in FIG. 1. The container 300 has a body 302. A plurality of posts 304 protrude from an upper portion of an outer surface 306 of the body 302. The first and second ejector assemblies 206, 208 engage the posts 304 to retain the container 300 as show in FIG. 3B, as will be described in greater detail subsequently. A forward pair of posts 304a, 304b is constrained by the first ejector assembly 206 while an aft pair of posts 304c, 304d is constrained by the second ejector assembly 208.

Figure 4:
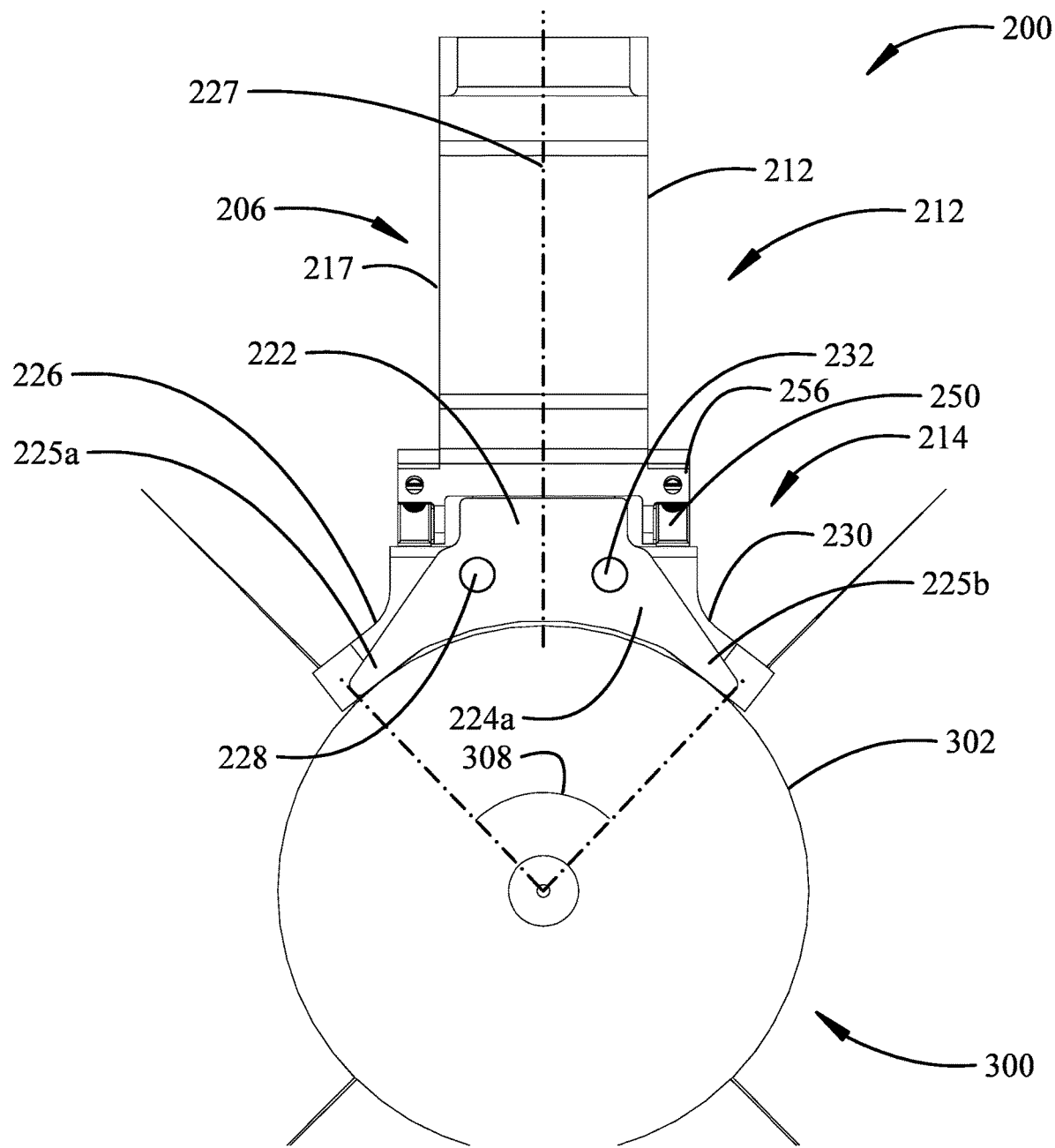
FIG. 4 is a detailed front view of the example container suspension and release system of FIG. 2A coupled to the example container of FIG. 3A shown in an example stored position.
Figure 5A:
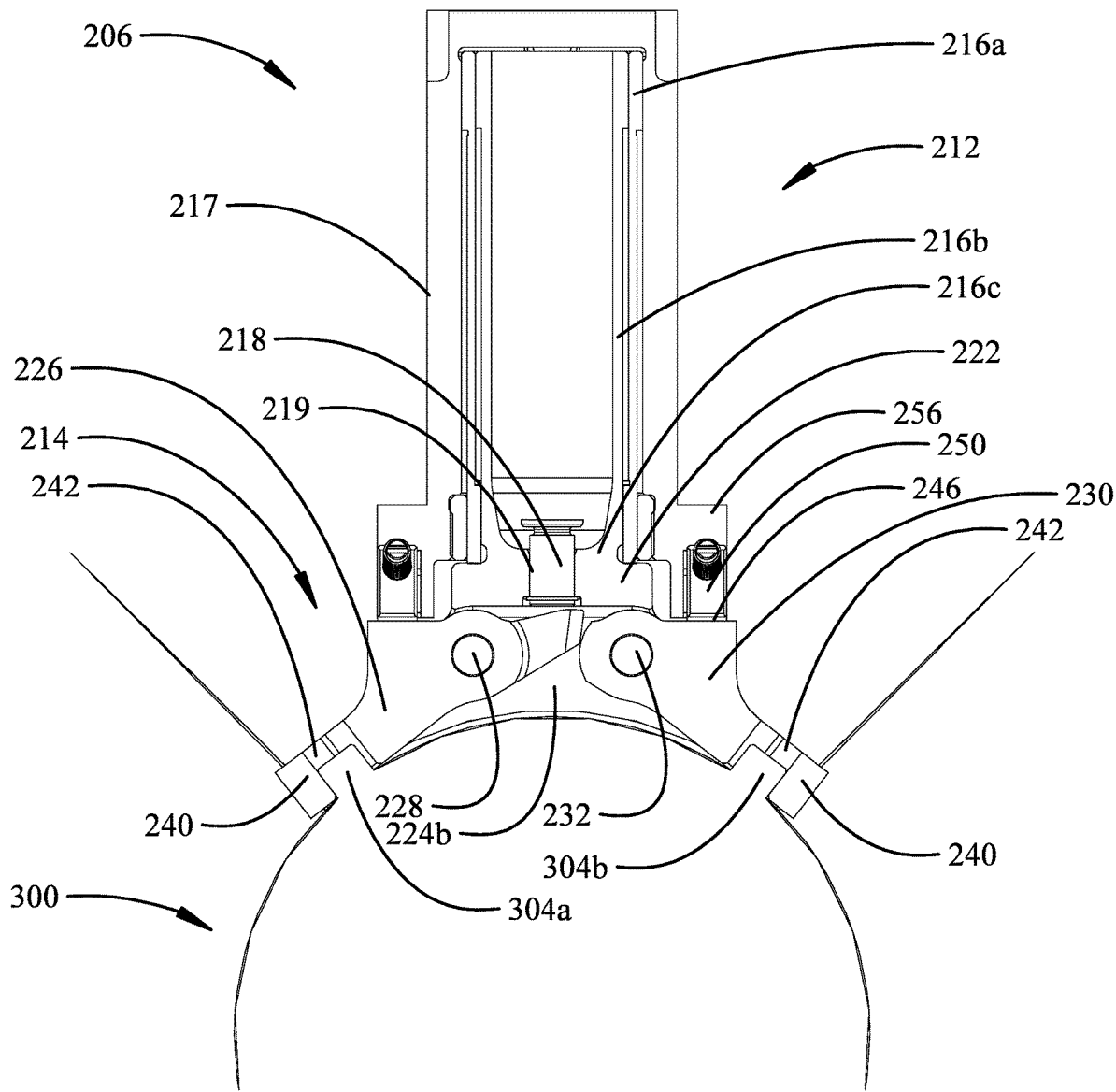
FIG. 5A is a cross-sectional view taken along line 5-5 of FIG. 3B.

Referring to FIGS. 2A, 4 and 5A, the first and second ejector assemblies 206, 208 each incorporate an actuator 212 and a retention assembly 214. The actuator 212 extends the retention assembly 214 from the retracted or stored position 202 of FIG. 2A to the extended or deployed position 204 of FIG. 2B.

The actuator 212 in the exemplary implementation incorporates an outer cylinder 216a and a concentric inner cylinder 216b, the outer cylinder concentrically received in a housing 217. The outer and inner cylinders 216a, 216b, configured to telescopically extend from the housing 217 to the deployed position 204 of the ejector assembly. Inner cylinder 216b has a cap 216c sealing the concentric cylinders for reaction of the pressurized fluid introduced into housing 217 through conduit 211b for extension. An ejection piston 218 is received in a bore 219 in the cap 216c for reciprocating motion at the extended position of the actuator 212, as will be described in greater detail subsequently.

The retention assembly 214 includes a bracket 222 mounted to or integral with the inner cylinder 216b or the cap 216c. A forward fixed sway brace 224a and an aft fixed sway brace 224b are attached to or extend from the bracket 222. As seen in FIG. 4, the forward and aft fixed sway braces 224a, 224b are closely spaced from the outer surface 306 of the container 300 to engage the container under adverse loading conditions. Each fixed sway brace 224a, 224b includes a left lateral flange 225a and a right lateral flange 225b extending oppositely from a center plane 227 of the retention assembly 214 to partially encircle at least an upper sector 308 of the body 302 of the container 300. In alternative implementations, a single fixed sway brace on the retention assembly 214, either forward or aft, associated with each of the first and second ejector assemblies 206, 208 may be employed.

A left retention arm 226 is pivotally attached to the bracket 222 with a first pivot pin 228 and a right retention arm 230 is pivotally attached to the bracket 222 with a second pivot pin 232. The left retention arm 226 and right retention arm 230 are configured to rotate in opposite directions about the respective first and second pivot pins 228, 232 from an engaged condition to a released condition to release the container 300, as will be described in greater detail subsequently. In the example implementation, the left and right retention arms are disposed between the forward and aft fixed sway braces 224a and 224b.

Figure 5B:
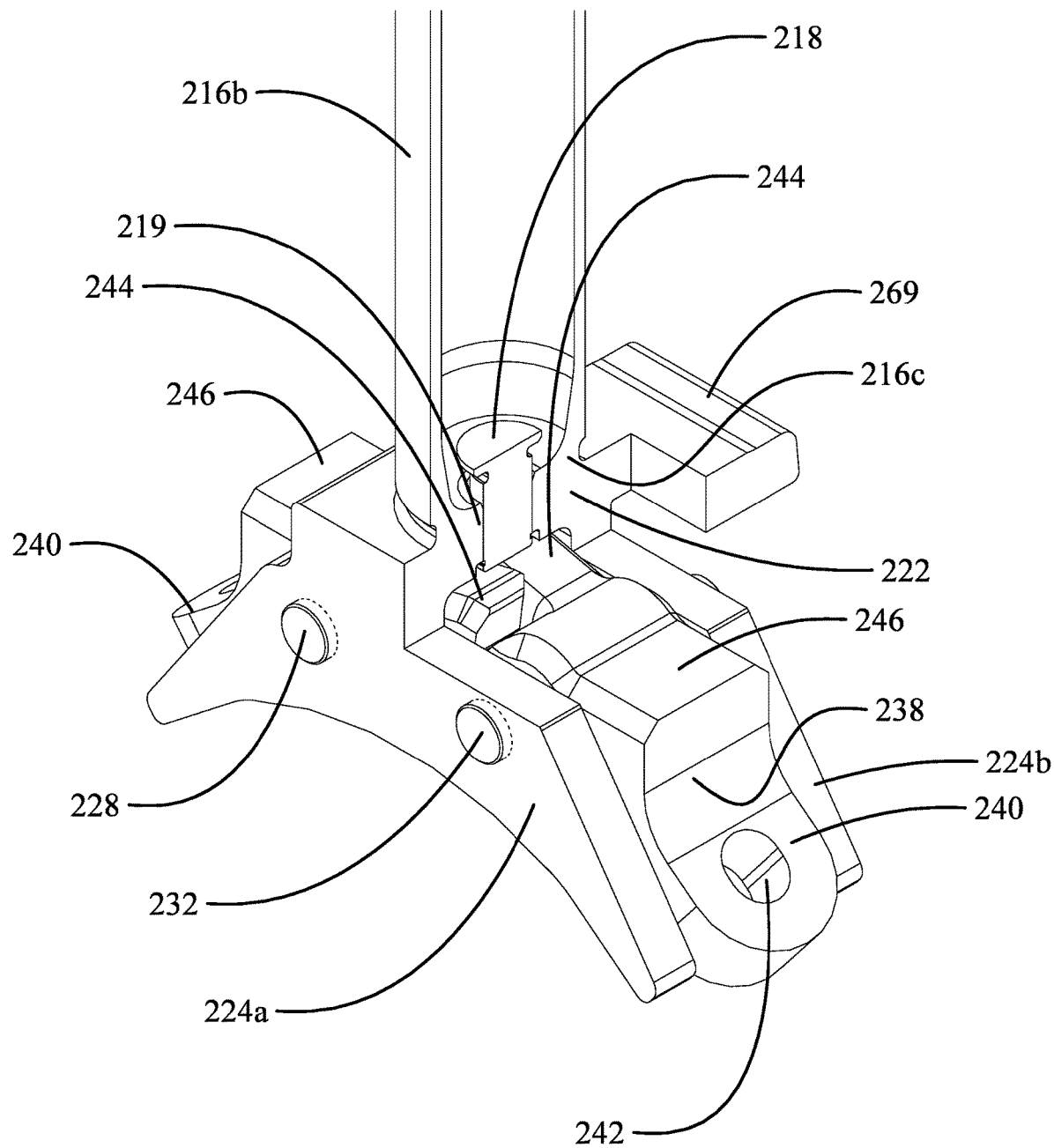
FIG. 5B is a detailed pictorial partial section representation of the retention assembly.
Figure 5C:
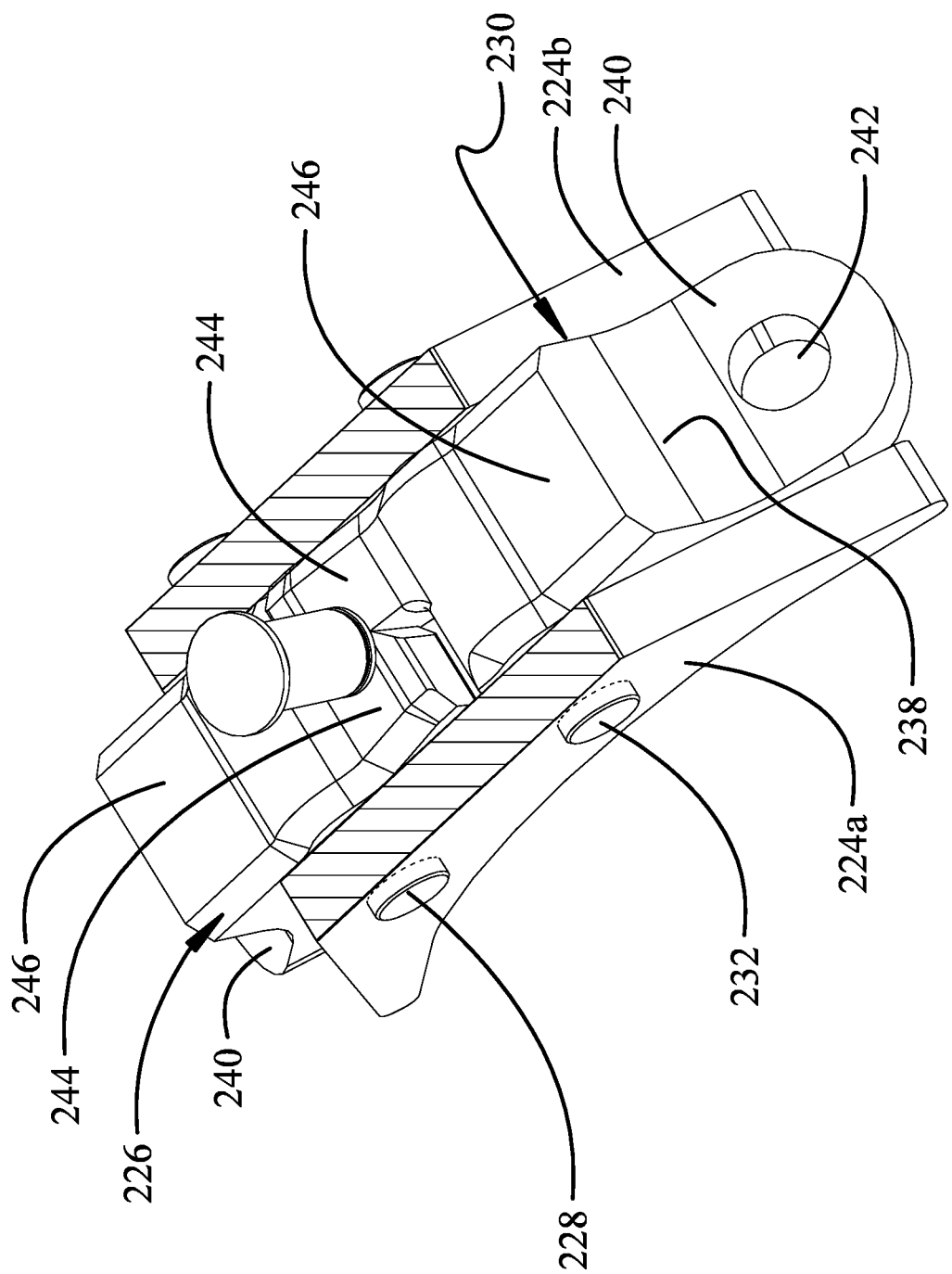
FIG. 5C is a further sectioned representation of the retention assembly displaying details of the retention arms.

As seen in FIGS. 5B and 5C, each of the left and right retention arms 226, 230 incorporates a body 238 which receives the respective first or second pivot pin 228, 232. An engagement flange 240 extends from the body 238. The engagement flange 240 incorporates a receptacle 242 which releasably receives an associated post in the plurality of posts 304 to engage the retention arm with the container 300. A rotation lever 244 extends from the body 238 oppositely from the engagement flange 240. Ejection piston 218 engages the rotation lever 244 on each of the left and right retention arms 226, 230 to operate as a first example of a rotation activation mechanism 229 for the rotation of the left and right retention arms 226, 230 from the engaged condition to the released condition, as will be described in greater detail subsequently.

The body 238 of each of the left and right retention arms 206, 208 additionally incorporates a locking flat 246. In the retracted or stored position of the retention assembly 214, a wedge 250 contacts the locking flat 246 preventing rotation of the associated retention arm 226 or 228 thereby maintaining the engaged condition. In the exemplary implementation, the wedge 250 is secured with a biasing element 252 in a recess 254 in a boss 256 laterally extending from the housing 217 of the actuator 212. The biasing element 252 positions the wedge 250 on a tapered surface 258 of the recess 254 allowing vertical adjustment of the wedge 250 to accommodate variation in position of the post engaged in the receptacle.

A latch assembly 260 is associated with each of the first and second ejector assemblies 206, 208 to secure the ejector assemblies in the retracted or carry position 202 as seen in FIG. 2A. Each latch assembly 260 incorporates a rocker 262 engaged for rotational motion with an axle 263 in a clevis 264 extending from the actuator 212. The rocker 262 incorporates a hook 266 at a first end and a connecting clevis 268 at a second end. The hook 266 engages a locking flange 269 extending from the bracket 222 of the retention assembly 214. An actuating rod 270 is engaged in the connecting clevis 268 and translation of the actuating rod rotates the rocker 262 about axle 263 to release the hook from the locking flange 269. Translation of the actuating rod 270 is accomplished by the energy source 210 concurrent with actuation of the first and second ejector assemblies 206, 208.

Figure 6A:
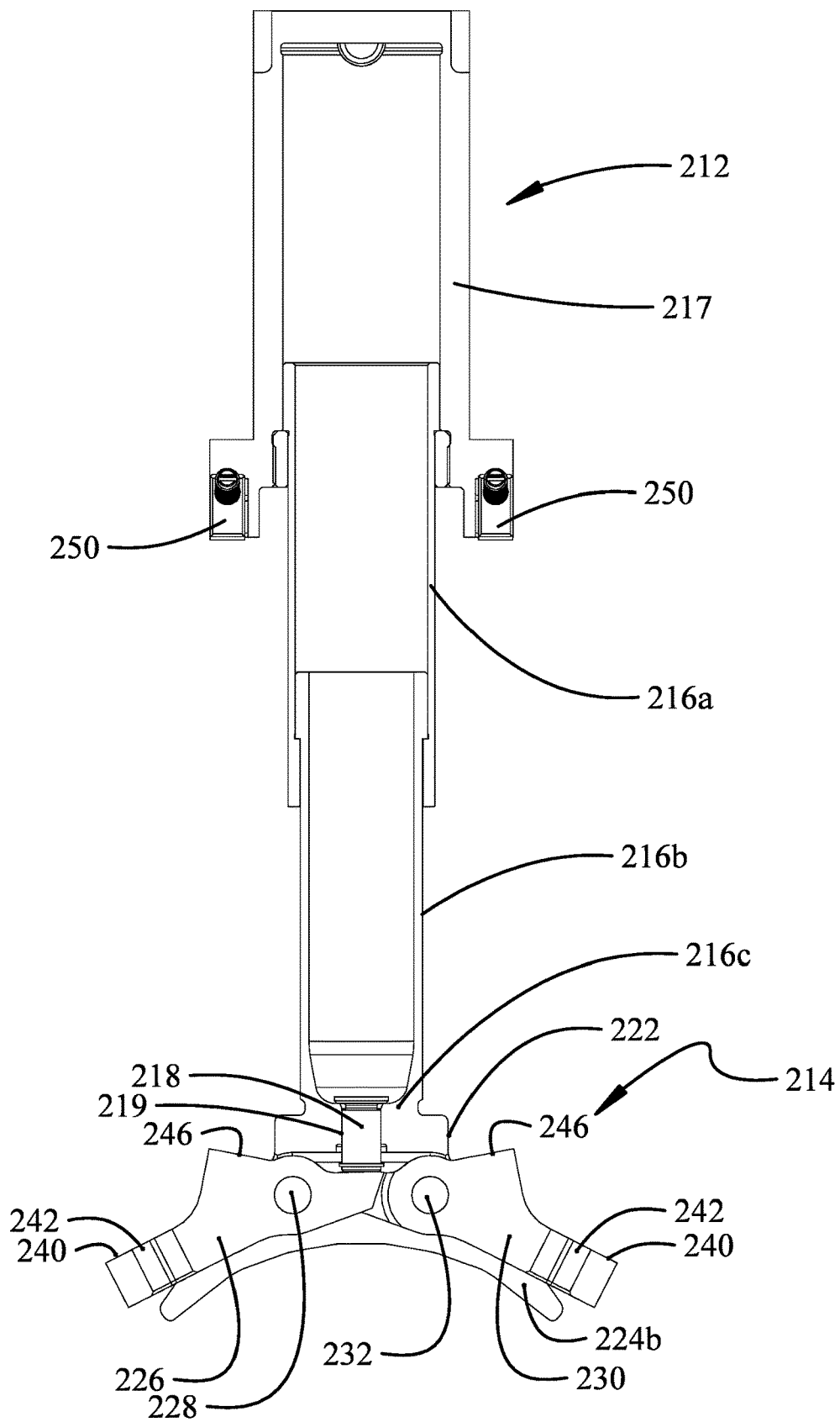
FIG. 6A is a cross-sectional taken along line 6-6 of FIG. 3C showing the example container suspension and release system in an example deployed position.
Figure 6B:
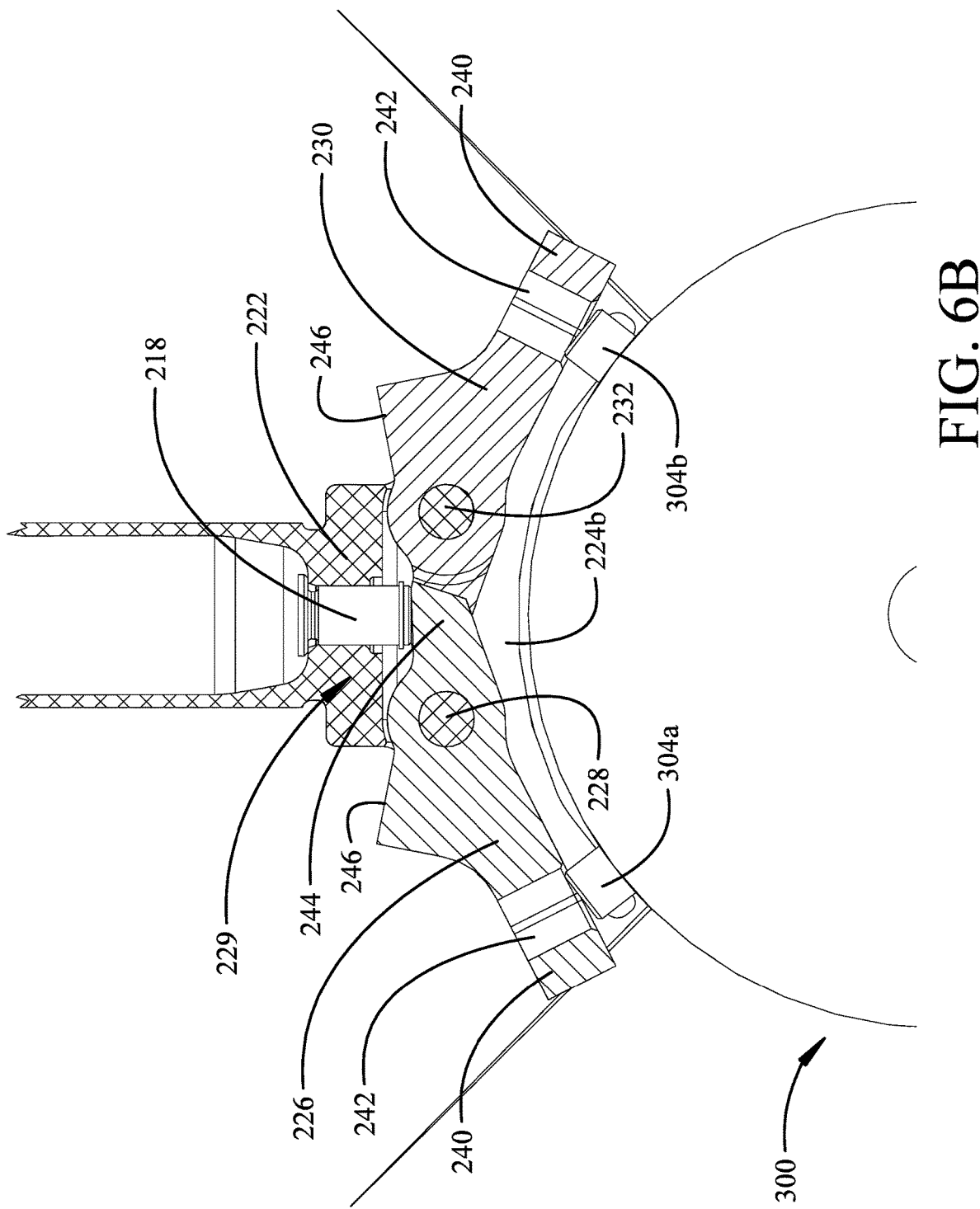
FIG. 6B is a detailed cross-sectional view demonstrating a first implementation of a rotation actuation mechanism activating the deployed position of the store retention arms.

Referring to FIGS. 2B, 6A and 6B, operation of the container suspension and release system 200 in deploying a container 300 is illustrated with the first and second ejector assemblies 206, 208 in the extended or deployed position. Upon activation of the energy source 210, the latching assemblies 260 are disengaged from the locking flanges 269 and the actuators 212 in the first and second ejector assemblies 206, 208, extend the telescopic outer cylinder 216a and inner cylinder 216b through pneumatic force acting on the cap 216c (in the example implementation).

At the completion of the extension stroke of the cylinders, the rotation activation mechanism 229 is implemented as ejection piston 218 driven into the rotation levers 244. Timing of the reciprocation of the ejection piston 218 is delayed until the completion of the telescopic extension of the outer and inner cylinders 216a, 216. Upon full extension (in the example implementation), pressure on a head 221 of the ejection piston 218 urges the piston to extend through the bore 219. With the retention assemblies 214 extended from the housing 217, the locking flat 246 is separated from the wedge 250 and translation of the ejection piston 218 causes the retention arms 226, 230 to rotate about the pivot pins 228, 232. Rotation of the left retention arm 226 clockwise and right retention arm 230 counterclockwise to the released condition disengages the receptacles 242 from the plurality of posts 304 (posts 304a, and 304b in FIG. 6B) freeing the container to fall. During the extension and until the container 300 falls, forward and aft fixed sway braces 224a and 224b in the first and second ejector assemblies 206, 208 maintain alignment of the container 300 and urge separation of the container 300 and posts 304 from the left and right retention arms 226, 230 and receptacles 242.

Figure 7:
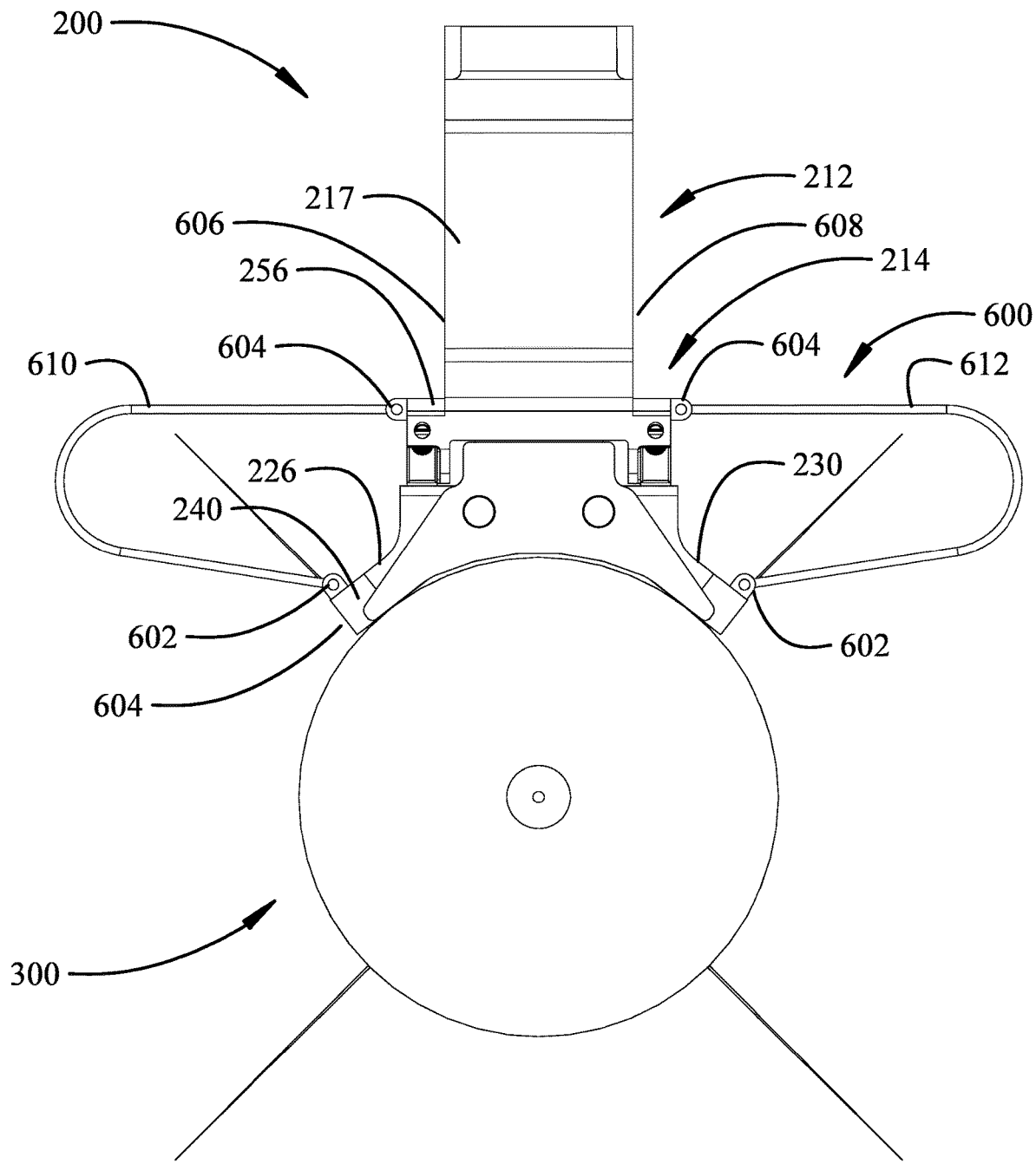
FIG. 7 is a front view of a second implementation of the container suspension and release system with an alternative rotation actuation mechanism for activating the deployed position of the store retention arms.
Figure 8:
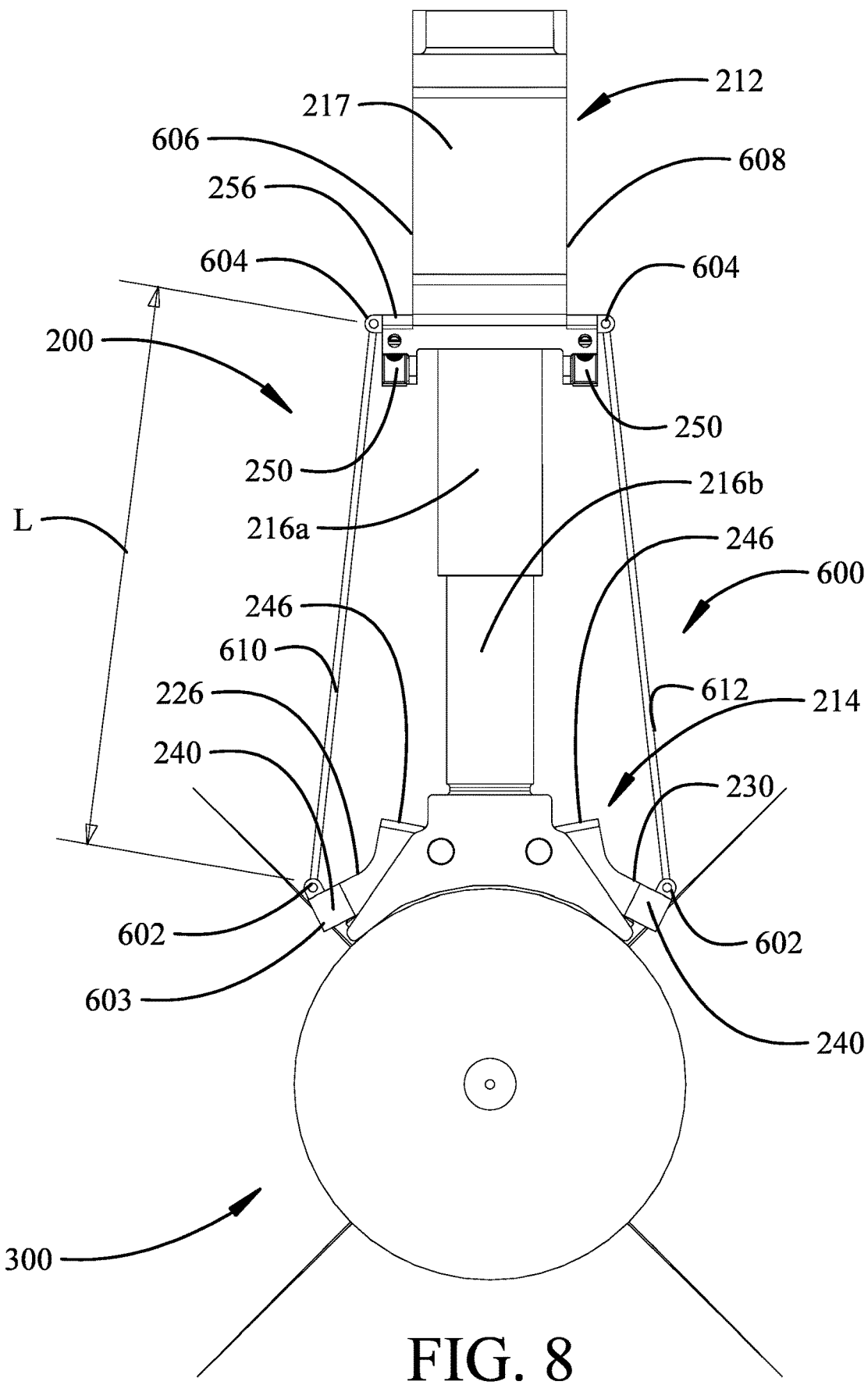
FIG. 8 is a front view of the second implementation of FIG. 7 in the deployed position.

A second implementation of the container suspension and release system 201 with an alternative rotation activation mechanism 600 for rotation of the retention arms 226, 230 is shown in FIGS. 7 and 8. Structure and operation of the first and second ejector assemblies 206, 208 is substantially similar to the first example implementation and like components carry the same element numbers. Left retention arm 226 and right retention arm 230 in each of the retention assemblies 214 include a lower attachment eye 602 proximate an outboard end 603 of the engagement flange 240. An upper attachment eye 604 extends from the boss 256 on both the left and right sides 606, 608 of the housing 217 of the actuator 212.

A left lanyard 610 extends from the upper attachment eye 604 on the left side 606 of the housing 217 to the lower attachment eye 602 on the engagement flange 240 of left retention arm 226. Similarly, a right lanyard 612 extends from the upper attachment eye 604 on the right side 608 of the housing 217 to the lower attachment eye 602 on the engagement flange 240 of right retention arm 230.

In the retracted or stored position of the first and second ejector assemblies 206, 208 as seen in FIG. 7, the left and right lanyards 610, 612 are in a loose or flexed configuration due to the proximity of the lower attachment eyes 602 to the upper attachment eyes 604 and the left and right retention arms 226, 230 remain in the engaged condition.

Upon extension of the first and second ejector assemblies 206, 208 to the extended or deployed position as seen in FIG. 8, the left and right lanyards 610, 612 are in a straight or taunt configuration.

In the extended or deployed position of FIG. 8, retention assemblies 214 are extended from the housing 217 and the locking flat 246 is separated from the wedge 250. The length L of the left and right lanyards 610, 612 is configured whereby transition to the taunt configuration during a final portion of the extension of the outer and inner cylinders 216a 216b will result in rotation of the left retention arm 226 and right retention arm 230 about the pivot pins 228, 232 to the released condition disengaging the receptacles 242 from the plurality of posts 304 freeing the container to fall.

The alternative rotation activation mechanism of FIGS. 7 and 8 may be employed in addition to the piston 218 or as an alternative thereto wherein the piston 218 may be eliminated, a sealed cap 216c employed and left and right retention arms 226, 230 do not incorporate rotation levers 244.

Figure 9:
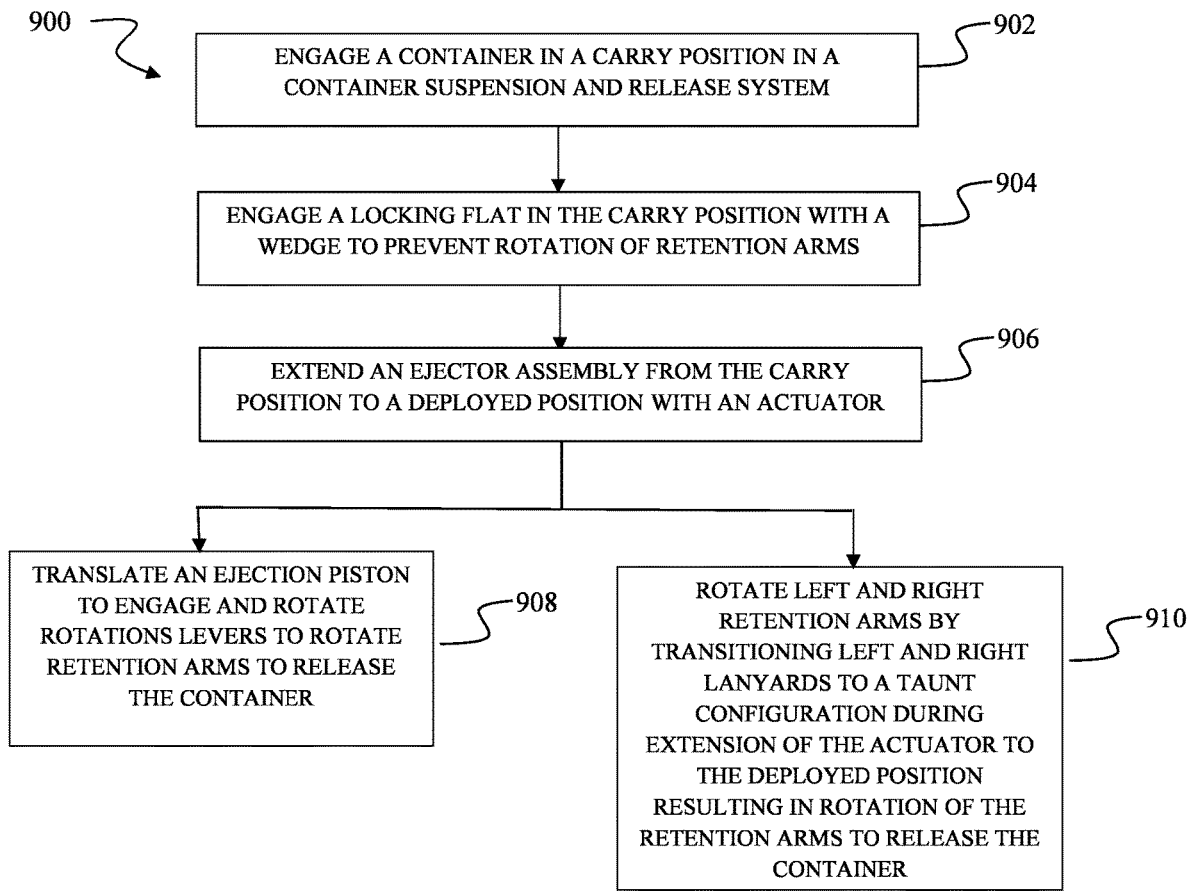
FIG. 9 is a flow chart demonstrating a method for carrying and release of a container employing the implementations disclosed.

The implementations disclosed herein provide a method 900 for captive carry and release of a container on an aircraft as shown in FIG. 9. A container is engaged in a carry position in a container suspension and release system with at least one ejector assembly having a retention assembly with at least one fixed sway brace, a left retention arm and a right retention arm, step 902. The left and right retention arms each include a body having a locking flat and the locking flat is engaged in the carry position with a wedge extending from the actuator to prevent rotation of the retention arm, step 904. The at least one ejector assembly is extended from the carry position to the deployed position with an actuator, step 906. The left and right retention arms are rotated in the deployed position with a rotation activation mechanism.

In a first implementation of the rotation activation mechanism the left and right retention arm each incorporate a body receiving a respective first or second pivot pin, an engagement flange extending from the body, the engagement flange having a receptacle releasably receiving an associated post in a plurality of posts to engage the retention arm with the container and a rotation lever extending from the body oppositely from the engagement flange, and the rotation activation mechanism comprises an ejection piston engaging the rotation lever. With that configuration, the ejection piston is translated to engage and rotate the rotation levers to rotate the retention arms, step 908.

In a second implementation the rotation activation system incorporates a lower attachment eye proximate an outboard end of an engagement flange on each of the left retention arm and right retention arm and an upper attachment eye extends from each of a left side and a right side of a housing of the actuator. A left lanyard extends from the upper attachment eye on the left side of the housing to the lower attachment eye on the engagement flange of left retention arm. A right lanyard extends from the upper attachment eye on the right side of the housing to the lower attachment eye on the engagement flange of right retention arm. Rotating the left and right retention arms is accomplished by transitioning the left and right lanyards to a taunt configuration during a final portion of an extension of the actuator to the deployed position resulting in rotation of the left retention arm and right retention arm, step 910.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims. Within the specification and the claims, the terms "comprising", "incorporate", "incorporates" or "incorporating", "include", "includes" or "including", "has", "have" or "having", and "contain", "contains" or "containing" are intended to be open recitations and additional or equivalent elements may be present. The term "substantially" as used within the specification and claims means that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide. As used herein the terms "outboard" and "inboard", "upper" and "lower", "forward" and "aft" or "rearward", "leading" and "trailing", and "right" and "left" are employed to describe relative positioning and other than for the specific implementations disclosed may be substituted with appropriate descriptors such as "first" and "second", "top" and "bottom" or "right" and "left" depending on orientation of actual implementation.

What is claimed is:

1. A container suspension and release system comprising:
a first ejector assembly and a second ejector assembly having a carry position to retain a container and the first and second ejector assemblies configured to simultaneously deploy to release the container, the first and second ejector assemblies each having
an actuator configured to extend the first or second ejector assembly from the carry position to a deployed position, the actuator having
a housing,
an outer cylinder concentrically received in the housing;
an inner cylinder concentrically received within the outer cylinder, said inner and outer cylinders configured to telescopically extend from the housing to the deployed position, said inner cylinder having a cap sealing the concentric inner and outer cylinders for reaction of a pressurized fluid introduced into the housing and the ejection piston is received in a bore in the cap for reciprocating motion at the deployed position of the actuator;
a retention assembly with
a bracket attached to the actuator;
a forward fixed sway brace extending from the bracket and an aft fixed sway brace extending from the bracket;
a left retention arm having a left body rotatably attached to the bracket with a first pivot pin, a left engagement flange extending from the left body, the left engagement flange having a first receptacle releasably receiving an associated post in a plurality of posts to engage the left retention arm with the container, and a left rotation lever extending from the left body oppositely from the left engagement flange;
a right retention arm having a right body rotatably attached to the bracket with a second pivot pin, a right engagement flange extending from the right body, the right engagement flange having a second receptacle releasably receiving an associated post in a plurality of posts to engage the right retention arm with the container, and a right rotation lever extending from the right body oppositely from the left engagement flange, said left and right retention arms disposed between the forward and aft fixed sway braces and configured to rotate in opposite directions;
an ejection piston engaging the right rotation lever and the left rotation lever, the ejection piston configured to rotate the left and right retention arms thereby rotating the left and right engagement flanges from an engaged condition in the carry position to a released condition in the deployed position in response to actuation of the actuator thereby releasing the container from the at least one ejector assembly;
an energy source connected to the actuator to provide energy to actuate the first ejector assembly and the second ejector assembly.

2. The container suspense and release system as defined in claim 1 wherein the forward and aft fixed sway braces each comprise a left lateral flange and a right lateral flange extending oppositely from a center plane of the retention assembly to partially encircle at least an upper sector of the container.

3. The container suspension and release system as defined in claim 1 wherein the left body and right body each incorporate a locking flat and further comprising: a wedge contacting the locking flat in the carry position of the retention assembly thereby preventing rotation of the left and right retention arms, the wedge secured with a biasing element in a recess in a boss laterally extending from a housing of the actuator whereby the biasing element positions the wedge on a tapered surface of the recess thereby allowing vertical adjustment of the wedge.

4. The container suspension and release system as defined in claim 1 wherein the first and second ejector assemblies each further comprise a latch assembly having
- a rocker engaged for rotational motion with an axle in a clevis extending from the actuator, wherein the rocker incorporates a hook at a first end and a connecting clevis at a second end;
- a locking flange extending from the bracket of the retention assembly configured to engage the hook; and
- an actuating rod is engaged in the connecting clevis whereby translation of the actuating rod rotates the rocker about the axle to release the hook from the locking flange.

5. A container suspension and release system comprising:
at least one ejector assembly having a carry position to retain a container and a deployed position to release the container, said at least one ejector assembly having an actuator having
- a housing,
- an outer cylinder concentrically received in the housing;
- an inner cylinder concentrically received within the outer cylinder, said inner and outer cylinder configured to telescopically extend from the housing to the deployed position, said inner cylinder having a cap sealing the concentric inner and outer cylinders for reaction of a pressurized fluid introduced into the housing to extend the at least one ejector assembly from the carry position to the deployed position;

a retention assembly with
- a bracket attached to the actuator;
- at least one fixed sway brace extending from the bracket;
- a left retention arm pivotally attached to the bracket;
- a right retention arm pivotally attached to the bracket, said left and right retention arms configured to rotate in opposite directions wherein the left and right retention arms each further comprise a rotation lever; and a rotation activation mechanism comprising an ejection piston received in a bore in the cap for reciprocating motion at the deployed position of the actuator engaging the rotation lever of each of the left and right retention arms to rotate the left and right retention arms from an engaged condition in the carry position to a released condition in the deployed position in response to actuation of the actuator thereby releasing the container from the at least one ejector assembly.

* * * * *